A. LYON.
Parasol-Handles.

No. 149,322.

Patented April 7, 1874.

UNITED STATES PATENT OFFICE.

ANDREW LYON, OF BOSTON, MASSACHUSETTS.

IMPROVEMENT IN PARASOL-HANDLES.

Specification forming part of Letters Patent No. 149,322, dated April 7, 1874; application filed March 6, 1874.

*To all whom it may concern:*

Figure 1:
Figure 2:
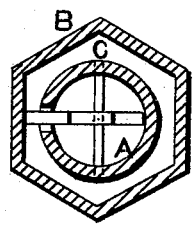
Figure 3:
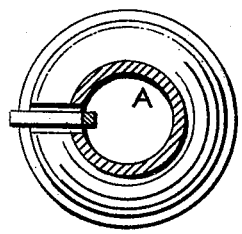

Be it known that I, ANDREW LYON, of Boston, Massachusetts, have invented an Improved Extension-Handle for Sun-Shades and other articles, of which the following is a specification:

In the drawings, Figure 1 is a longitudinal section of my improved handle. Fig. 2 is a transverse section on the line E E, Fig. 1, and Fig. 3 on the line H H, Fig. 1.

B is a tube, of an inner diameter considerably larger than the rest of the handle A, which is the ordinary tube usually used in extension-handles. D is a small tube, provided with a screw-thread at one end, and of an inner diameter only a trifle larger than the outer diameter of the tube A, which fits it so snugly as to prevent wabbling, and yet allow the tube A to be moved lengthwise. This tube D is inserted in the tube B, as shown in the drawings; and it is this combination of these three tubes A, B, and D which constitutes the main feature of my invention. The object of this feature is to remedy an objection to which all other extension-handles known to me are liable, viz., the danger of pulling the tube A out of the tube B. As these handles are now constructed, the tube B is of an inner diameter only a trifle larger than the outer diameter of the tube A, which fits it snugly, and consequently the stop-tube (corresponding to D) receives the upper end of the tube B, instead of entering it, as in my handle, and a small steel washer is soldered in the outer end of this stop-tube, against which the feather on the lower end of the tube A strikes when the handle is fully extended. This is the only provision made for preventing the tube A from being pulled entirely out of the tube B, and this provision is defective, as the steel washer is apt to break away from the stop-tube in use. This part of my invention consists in the use of a tube for the lower part of the handle, whose diameter is enough greater than the outer diameter of the tube forming the upper part of the handle to allow the stop-tube to extend into the upper end of this larger tube, as shown in the drawings, instead of its upper end extending into the stop-tube, as in all other extension-handles known to me. In this way the feather on the lower end of the smaller tube A (in common use in all these handles to create the friction necessary to keep the tubes in the desired relative position, and to act as a stop in connection with the steel washer, above mentioned, to prevent the tube A from being drawn entirely out of the tube B) will strike against the inner end of the stop-tube D, (supposing the part C removed, as it is not essential to this part of my invention,) instead of striking against the steel washer soldered into its outer end. The part C is a short tube secured upon the tube A, and serves to keep it central in relation to the tube B; it also serves as a stop, in lieu of the feather, when placed above the feather, as in the drawings. If the tube B be made six-sided, as shown in the drawings, or of any other than a circular cross-section, and this part C be made to fit it, it will also prevent the tube A turning in the tube B; and this combination of the six-sided tube B, (or tube non-circular in cross-section,) the smaller tube A, the intermediate short tube C, and the stop-tube D constitutes the second part of my invention. This tube C may be placed either above or below the feather.

What I claim as my invention is—

1. The extensible handle composed of the tubes A, B, and D, combined and arranged as described and shown.

2. The combination of the six-sided tube B, the cylindrical tube A, short tube C, and stop-tube D, constructed as described, and for the purpose specified.

ANDREW LYON.

Witnesses:
J. E. MAYNADIER,
H. W. CARROLL.